United States Patent
Maher (10) Patent No.: US 9,342,283 B2
(45) Date of Patent: May 17, 2016

(54) PROFILING BINARY CODE BASED ON DENSITY

(71) Applicant: Facebook, Inc., Menlo Park, CA (US)

(72) Inventor: Bertrand Allen Maher, Newark, CA (US)

(73) Assignee: Facebook, Inc., Menlo Park, CA (US)

(*) Notice: Subject to any disclaimer, the term of this patent is extended or adjusted under 35 U.S.C. 154(b) by 40 days.

(21) Appl. No.: 14/179,246

(22) Filed: Feb. 12, 2014

(65) Prior Publication Data

US 2015/0227352 A1 Aug. 13, 2015

(51) Int. Cl.
*G06F 9/45* (2006.01)

(52) U.S. Cl.
CPC ............. *G06F 8/443* (2013.01); *G06F 8/447* (2013.01); *G06F 8/4434* (2013.01); *G06F 8/4441* (2013.01); *G06F 8/4442* (2013.01)

(58) Field of Classification Search
None
See application file for complete search history.

(56) References Cited

U.S. PATENT DOCUMENTS

| | | | | |
|---|---|---|---|---|
| 6,321,240 B1 * | 11/2001 | Chilimbi | ............... | G06F 8/4442 |
| 6,678,886 B2 * | 1/2004 | Kumon | .......................... | 717/151 |
| 8,549,505 B2 * | 10/2013 | Kimura | .......................... | 717/158 |
| 9,081,588 B2 * | 7/2015 | Griffin | .................. | G06F 8/4441 |
| 2001/0037497 A1 * | 11/2001 | Kumon | .............................. | 717/9 |
| 2003/0014741 A1 * | 1/2003 | Megiddo | ............... | G06F 8/4441 |
| | | | | 717/158 |
| 2003/0086620 A1 * | 5/2003 | Lucco | .................... | G06F 8/4434 |
| | | | | 382/232 |
| 2009/0070753 A1 * | 3/2009 | Chen | ........................ | G06F 8/443 |
| | | | | 717/155 |
| 2010/0077388 A1 * | 3/2010 | Kimura | ......................... | 717/158 |
| 2010/0114915 A1 * | 5/2010 | Gorton, Jr. | .............. | G06F 8/443 |
| | | | | 707/752 |
| 2011/0138373 A1 * | 6/2011 | Lane | ........................ | G06F 8/443 |
| | | | | 717/157 |
| 2011/0238957 A1 * | 9/2011 | Shirota et al. | .................. | 712/221 |
| 2013/0232477 A1 * | 9/2013 | Griffin | .................. | G06F 8/4441 |
| | | | | 717/158 |

OTHER PUBLICATIONS

Zhou, S., et al., Planning for Code Buffer Management in distributed virtual execution environments, Proceedings of the 1st ACM/USENIX international conference on Virtual execution environments, 2005, pp. 100-109, [retrieved on May 11 2015], Retrieved from the Internet: <URL:http://dl.acm.org/>.*

FOLDOC Free On-Line Dictionary of Computing: Definition for "Instrument", 2011, 1 page, [retrieved on Aug. 26, 2015], Retrieved from the Internet: <URL:http://foldoc.org/instrument>.*

(Continued)

*Primary Examiner* — Thuy Dao
*Assistant Examiner* — Geoffrey St Leger
(74) *Attorney, Agent, or Firm* — Perkins Coie LLP (57) ABSTRACT

The technology is directed to profiling binary code based on a computed "density" of functions in the code. The density of a function can be computed as the frequency of execution of the function divided by the size of the function. Functions that execute more often and are smaller in size ("dense functions") are moved towards the "front" (e.g., beginning) of the binary code. The frequency of execution can be measured at runtime using a performance measurement tool without requiring modification of the binary code or corresponding source code. After density is computed (e.g., over a period of time) for functions, it can be used to cause linkers to rearrange the binary code to place denser functions closer to the "front" of the binary code. By loading denser functions first (e.g., into processor caches and translation lookaside buffer ("TLB")), the technology reduces cache and TLB misses, and thereby improves system performance.

19 Claims, 6 Drawing Sheets

(56) References Cited

OTHER PUBLICATIONS

Huang, X., et al., Fast and efficient partial code reordering: taking advantage of dynamic recompilation, ISMM '06, Proceedings of the 5th international symposium on Memory management, 2006, pp. 184-192, [retrieved on Mar. 16, 2016], Retrieved from the Internet: <URL:http://dl.acm.org/>.*

McFarling, S., Program Optimization for Instruction Caches, ASPLOS III, Proceedings of the third international conference on Architectural support for programming languages and operating systems, 1989, pp. 183-191, [retrieved on Mar. 16, 2016], Retrieved from the Internet: <URL:http://dl.acm.org/>.*

Pettis, K. et al., "Profile Guided Code Positioning", Proceedings of the ACM SIGPLAN'90 Conference on Programming Language Design and Implementation, Jun. 20-22, 1990, pp. 1-27.

* cited by examiner

PROFILING BINARY CODE BASED ON DENSITY

TECHNICAL FIELD

Several of the disclosed embodiments relate to code profiling, and more particularly, to profiling binary code based on density of programming language constructs.

BACKGROUND

Code profiling is a form of dynamic program analysis that measures, for example, the space (memory) or time complexity of a program, the usage of particular instructions, or frequency and duration of function calls. The most common use of profiling information is to aid program optimization. Profiling is achieved by instrumenting either the program source code or its binary executable form using a tool, e.g., a profiler. A number of different techniques may be used by profilers. Profiling adds instructions to the target program (e.g., source code or corresponding object code) to collect the execution-related information. However, instrumenting a program can require access to source code, can cause performance changes, and may lead to inaccurate results and/or heisenbugs. Some techniques use special hardware in the computers to collect information; in this case the impact on the program is minimal compared to instrumentation.

However, regardless of whether the code is profiled using the instrumentation technique or the special hardware, in some cases, e.g., for PHP code, the optimization achieved by them is not significant. These techniques consider optimizing the code based on the frequently executed path in the code, frequently executed functions, etc. However, none of these optimizations produce significant improvement in the execution of code.

DETAILED DESCRIPTION

Technology is disclosed for profiling binary code based on a computed "density" of various entities in the binary code. The entities can includes various programming language constructs, e.g., functions and data structures. The density of a function is computed as the frequency of execution of the function divided by the size of (e.g., number of instructions in) the function. Execution frequency can include the number of times a function is called (e.g., over a period) and/or the percentage of application time spent in the function. In some embodiments, an application could contain a function that is invoked only a few times, but can constitute a majority of runtime of the application, e.g., by containing a long-running loop. So either metric can be used to determine the frequency of execution.

Functions that execute more often and are smaller in size ("dense functions") are moved towards the "front" (e.g., beginning) of the binary code. The frequency of execution can be measured at runtime using a performance measurement tool without requiring modification of the binary code or corresponding source code. After code density is computed (e.g., over a period of time or a number of instructions) for the functions, the observed code density can be used to cause linkers to rearrange the binary code to place denser functions closer to the "front" of the binary code. By loading denser functions first (e.g., into processor caches and translation lookaside buffer ("TLB")), the technology reduces cache and TLB misses, thereby improving system performance.

In some embodiments, the entity can be a data structure. The density of a data structure is computed as a function of a frequency of an access of the data structures and a size of the data structures. The data structures that are accessed more often and are smaller in size ("dense data structures") can also (or instead of code) be moved towards the front of the binary code.

Environment

Figure 1:
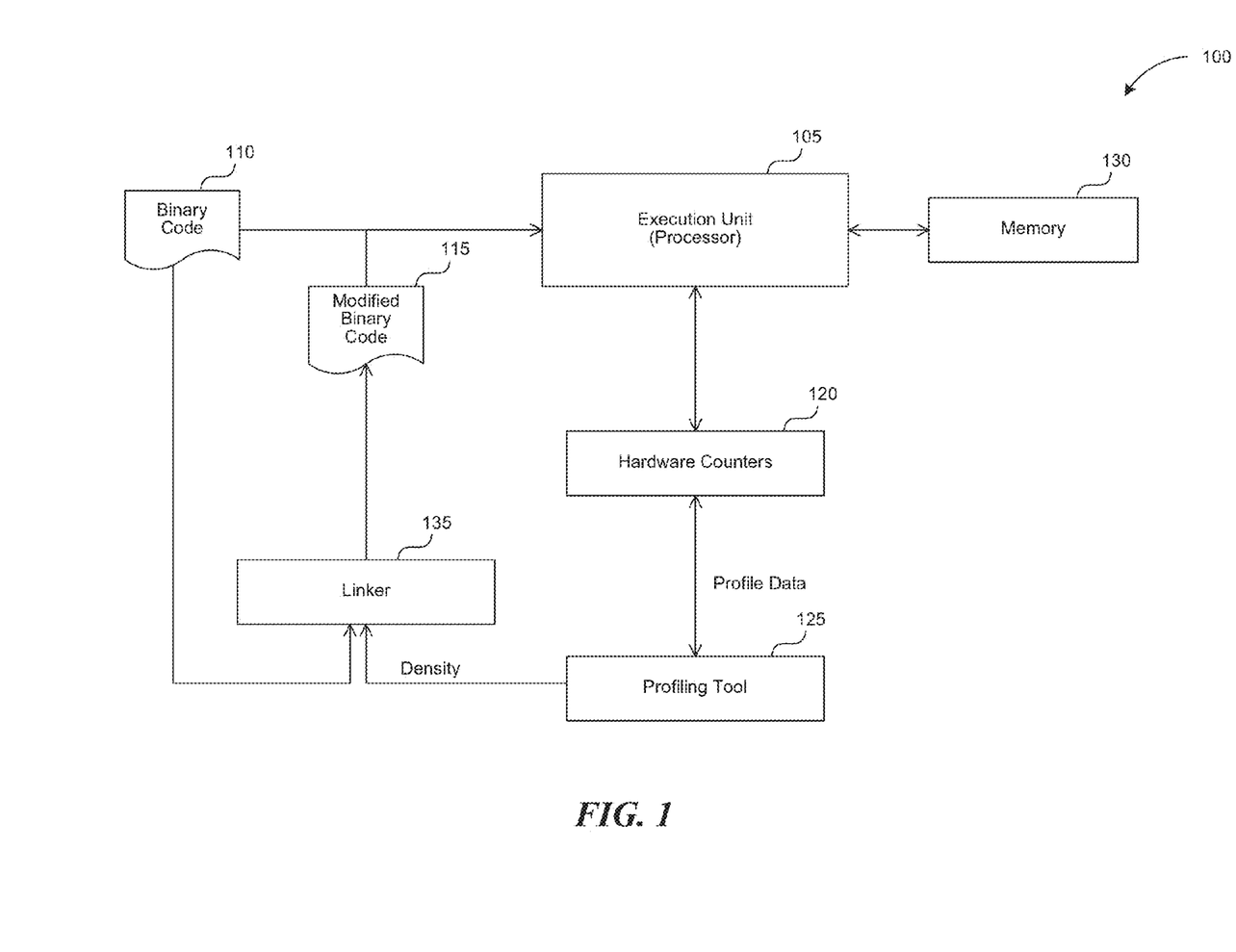
FIG. 1 is a block diagram illustrating an environment in which density-based code profiling can be implemented.

FIG. 1 is a block diagram illustrating a system 100 in which density-based code profiling can be implemented. The system 100 includes an execution unit 105 operable to execute binary code 110 (e.g., "object code"). The binary code 110 is a machine-executable code corresponding to a source code of a higher-level language that has been compiled, linked, and/or otherwise converted into an intermediate or finally assembled executable code. The source code includes instructions that specify various actions to be performed by a processor, e.g., the execution unit 105, and is generally written in "higher-level" or "user-readable" computer programming languages, e.g., C, C++, Java, PHP, Perl, Python, etc. The binary code 110 can be generated from the source code using a binary code generator (not illustrated), e.g., a compiler, a linker, etc. In some embodiments, the structure of the binary code 110 can depend on an architecture of the processor, e.g., execution unit 105, on which the binary code 110 is to be executed.

The execution unit 105 may be a processor, a processing core of a multi-core processor, or a processing element in a computing system. The execution unit 105 can include one or more processors that can execute the binary code 110. The execution unit 105 also reads from and writes to memory 130, e.g., instructions of binary code 110, data generated from or required for executing the binary code 110.

The system 100 includes a profiling tool 125 that is operable to measure various performance statistics of the binary code 110 and generate a profile data including the performance statistics. The profiling tool 125 can obtain the profile data of the binary code 110 using one or more hardware counters 120 associated with the execution unit 105. In some embodiments, the hardware counters 120 can be implemented as hardware registers. The profiling tool 125 can be configured to obtain or compute various performance statistics, e.g., number of times a process has executed; number of times a particular function in a process has executed; a frequency of execution of the processes and/or functions; amount of memory consumed by a process; percentage of processing time of a processor used by a process; a size of the process; number of processor instructions executed during a particular period of time; a density of functions, etc. In some embodiments, various hardware counters 120 provide various types of performance statistics. The profiling tool 125 is configured to read the appropriate hardware counters 120 based on the particular performance statistics that are to be obtained.

In some embodiments, the profiling tool 125 can be configured to operate as an event-based profiling tool. That is, the profiling tool 125 can sample the profile data based on various events, e.g., processor clock cycles (or processor cycles), processor instructions, etc. In some embodiments, the profiling tool 125 is configured to sample the profile data at a specified frequency (e.g., number of instructions executed by the execution unit 105). An example of the profiling tool 125 includes a "Perf" tool that is commonly deployed with LINUX, POSIX, UNIX and some other computer operating systems.

In the system illustrated in FIG. 1, the profiling tool 125 is configured to generate profile data having a density of various programming language constructs in the binary code 110, which is computed as a function of a frequency of execution and/or access of the programming language constructs and their corresponding sizes. For example, the profiling tool 125 can be configured to generate profile data including a density of the functions in the binary code 110. The profiling tool 125 samples the frequency of execution and size (e.g., no. of instructions) of various functions in the binary code 110. The profiling tool 125 may be configured to sample such profile data during a specified frequency, e.g., million instructions executed. The profiling tool 125 samples such profile data during the execution of the binary code in the system 100. After sampling the profile data for a pre-defined period, the profiling tool 125 computes the density of the functions in the binary code 110 and writes the density information in the profile data. In some embodiments, code density of a particular function is computed by dividing the frequency of execution of the function by the size (e.g., number of instructions) of the function.

After densities of functions are computed, the profiling tool 125 can send the profile data to a linker 135 for optimizing the binary code 110 based on the density of the functions. The linker 135 is an application that generates an executable code, e.g., binary code 110, by linking intermediate code, e.g., object files, generated by a binary code generator by compiling the corresponding source code. The linker 135 can be a stand-alone application or can be part of other applications, e.g., the binary code generator. The linker 135 optimizes the binary code 110 by rearranging the binary code 110 to place denser functions closer to the front of the binary code 110 starting with the most-dense function at the front of the binary code 110. That is, the functions are placed in the binary code 110 in a decreasing order of their corresponding density. The linker 135 generates a modified binary code 115 from such a rearrangement. The modified binary code 115 is loaded to the memory 130 for further execution by the execution unit 105.

In some embodiments, placing the denser functions at the front of the binary code 110 can include placing the denser functions in such a way that the number of pages used by hot functions is minimized. In some embodiments, the number of pages used by hot functions can be minimized by clustering the denser functions at a particular address range in the memory, e.g., lower memory addresses. The processor 105 can have some cache-control directives that can optimize the caching of the dense functions in various ways.

Figure 2:
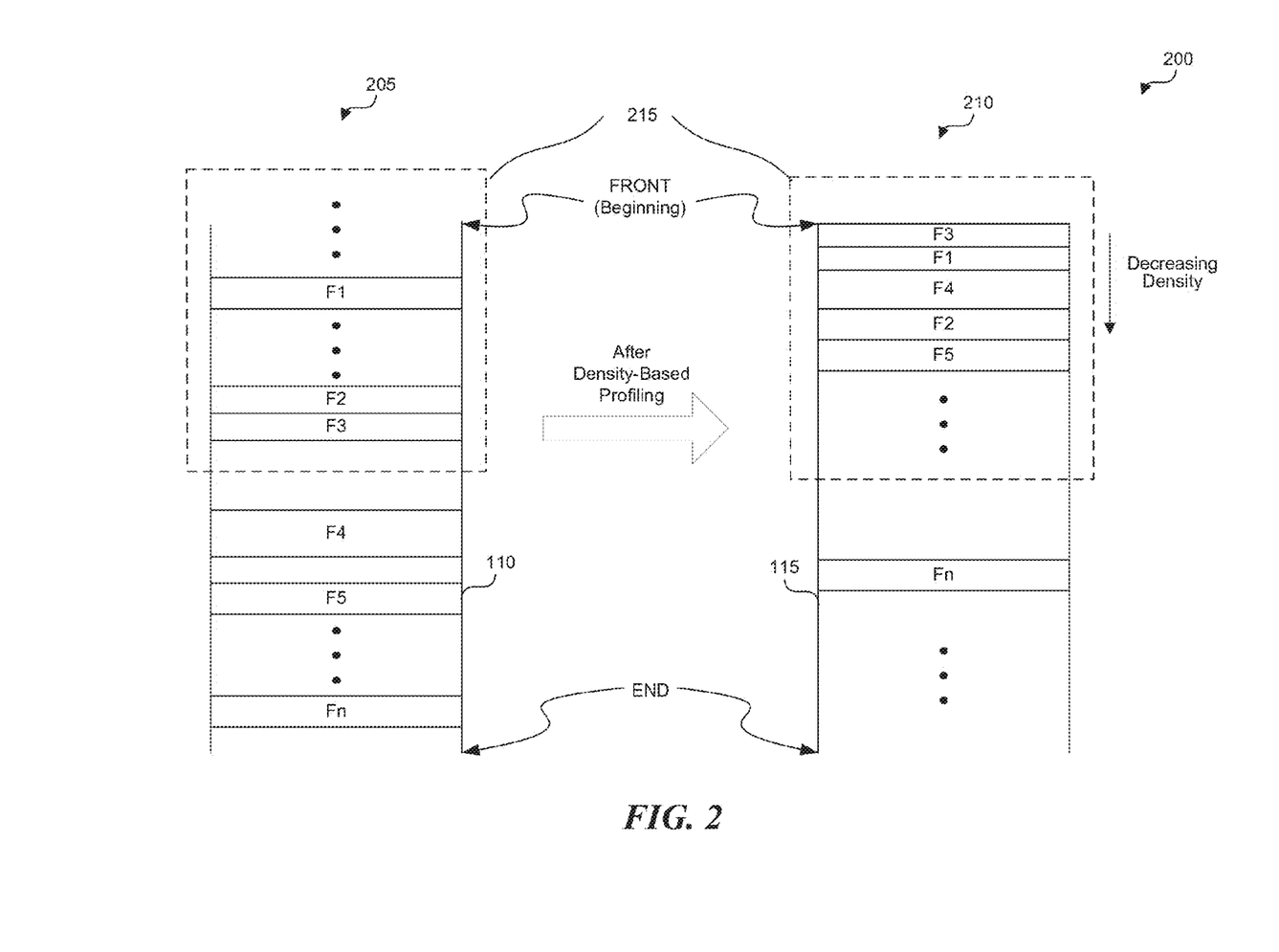
FIG. 2 is a block diagram illustrating an example of a layout of the binary code before and after density-based profiling, consistent with various embodiments.

FIG. 2 is a block diagram illustrating an example 200 of a layout of binary code before and after density-based profiling, consistent with various embodiments of the disclosed technology. The example 200 illustrates a layout 205 of the binary code before density-based profiling, e.g., binary code 110, in a portion 215 of the memory, e.g., memory 130 of FIG. 1. In some embodiments, the portion 215 of the memory 130 can be a cache storing instructions of a portion of the binary code 110. The cache can be a cache associated with a processor. The illustrated binary code 110 includes, among others, instructions corresponding to functions "F1"-"F5". Further, the illustrated binary code 110 is loaded into the cache 215 as illustrated in the layout 205 where instructions corresponding to functions "F1"-"F3" are in the cache 215 and the instructions corresponding to functions "F4"-"Fn" are outside the cache 215.

When the functions "F1"-"F3" are accessed more often than the other functions, executing the functions "F1"-"F3" may not consume more time compared to the other functions since the functions "F1"-"F3" are available in the cache 215 and can be loaded to the execution unit 105 faster than the other functions. However, when the functions "F4" and "F5" are accessed more often than the other functions, executing the functions "F4" and "F5" may consume more time compared to the other functions since accessing these functions can result in a cache miss/TLB miss since they are not available in the cache 215 and have to be obtained from non-cached portions of the memory 130 or another storage, e.g., a disk or any other secondary storage. The cache miss and/or TLB miss increases when the functions that are not in the cache are executed more often and can result in increased consumption of computing resources.

A TLB is an associative cache in which a processor, e.g., execution unit 105, stores recently used mappings from an operating system's page table. The operating system (e.g., of system 200) stores its mappings of virtual addresses to physical addresses in the page table. In some embodiments, the operating system accesses the memory 130 via virtual addresses and/or physical addresses. When a virtual address is translated into a physical address, e.g., to access one of the functions "F1"-"F5" stored in memory 130, the TLB can be searched first. If a match is found (a TLB "hit"), the physical address is returned and memory access for the functions can continue. However, if there is no match (a TLB "miss"), a handler can look up the address mapping in the page table to determine whether a mapping exists (a page walk). If one exists, it is written back to the TLB, and the faulting instruction is restarted (this may happen in parallel). This subsequent translation will find a TLB hit, and the memory access will continue.

The page table lookup may fail if the page is not resident in physical memory. This will occur if the requested page (e.g., functions "F1"-"F5") has been paged out of physical memory 130 to make room for another page. In this case, the page is paged to a secondary store, e.g., located on a hard disk drive (this secondary store, or "backing store", is often called a "swap partition" if its a disk partition or a swap file, "swapfile", or "page file" if it is a file). When this happens, the page can be read from disk into physical memory.

A TLB miss can cause a significant penalty, at least in terms of time required for obtaining access to the required memory locations. For example, while a TLB hit can consume 0.5-1 clock cycle, the penalty for a TLB miss can be in the range of 10-100 clock cycles. This can be more significant when a TLB miss is more frequent, for example, when more of the frequently accessed functions of the binary code 110 are not available in the cache 215 or memory 130, thereby increasing the consumption of computing resources.

Referring back to the example 200, a density-based profiled binary code, e.g., modified binary code 115, can minimize such increased consumption of computing resources. The example 200 illustrates a layout 210 of the binary code after profiling the binary code 110 based on the density of the functions "F1"-"F5." Profiling the binary code based on the density of the functions causes the functions "F1"-"F5" to be arranged in the modified binary code 115 in their decreasing order of density, with the most-dense function at the front, e.g., beginning of the modified binary code 115. Thus, more frequently executed and smaller functions can be placed closer to the front of the modified binary code 115 than less frequently executed and larger functions.

In the example 200, the sequence of the functions in decreasing order of density is laid out in layout 210 as follows: "F3," "F1," "F4," "F2" and "F5.". The most dense function, "F3," which has highest density among the functions "F1"-"F5" is placed at the "front" (e.g., beginning) of the modified binary code 115. In some embodiments, placing the denser functions at the "front" can include clustering the denser functions at a particular address range in the memory, e.g., lower memory addresses. When the modified binary code 115 (which has denser functions at the beginning) is loaded into the memory 130, more dense functions can be quickly loaded into the cache 215 from the beginning of the file as compared to less dense functions and other portions of the modified binary code 115 that appear later in the file. Since the more dense functions are executed frequently, having such functions in the cache 215 improves the system performance at least by minimizing the cache miss and/or TLB miss which can cause a delay in obtaining the functions from other non-cache portions of the memory 130 or any other storage frequently.

Placing more frequently executed instructions near the beginning of the file may also increase system performance, e.g., by reducing load times. However, in some embodiments, arranging the functions based on their density offers a significant improvement in performance of the system, at least in terms of the execution time of the modified binary code 115, compared to arranging the functions based on just their frequency of execution.

Figure 3:
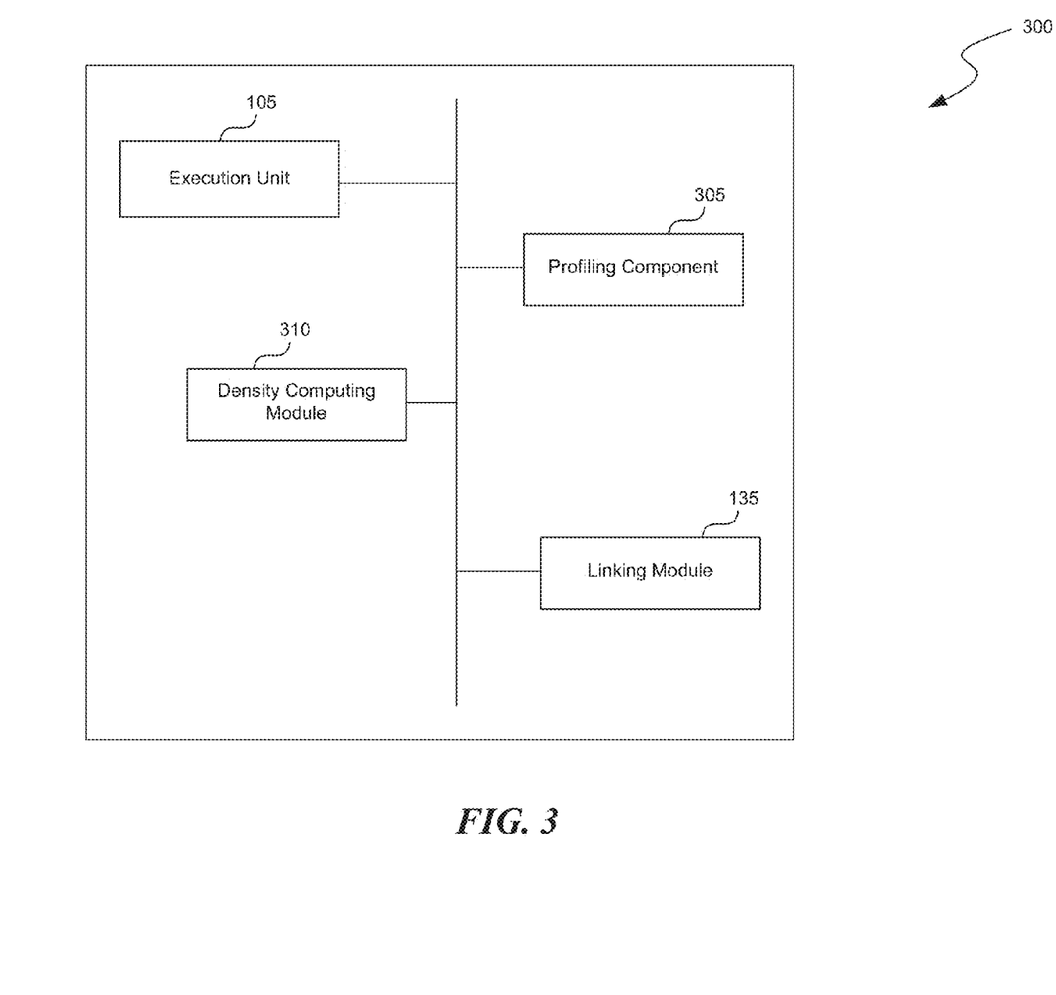
FIG. 3 is a block diagram of a system for implementing density-based profiling, consistent with various embodiments.

FIG. 3 is a block diagram of a system 300 for implementing density-based profiling, consistent with various embodiments of the disclosed technology. The system 300 has various components, including an execution unit 105, a profiling component 305, a density computing module 310 and a linking module 135 (also referred to as "linker 135"). The execution unit 105 is operable to execute a binary code, e.g., binary code 110 and/or modified binary code 115, of a corresponding source code. The execution unit 105 can include one or more processors.

The profiling component 305 measures various performance statistics of the binary code executed by the execution unit and generates a profile data including the performance statistics. The performance statistics can include a number of times a process has executed; a number of times a particular function in a process has executed; a frequency of execution of the processes, functions; amount of memory consumed by a process; percentage of processing time of a processor used by a process; a size of the process; a number of processor instructions executed for a particular period of time; a density of functions, etc. In some embodiments, the profiling component 305 is configured to measure and generate in the profile data a frequency of execution and size of the functions contained in the binary code.

The binary code executed by the execution unit 105 is devoid of any instrumentation for generating performance statistics. The profiling component 305 can obtain the performance statistics using one or more hardware counters associated with the execution unit 105. In some embodiments, the hardware counters 120 can be implemented as hardware registers. Various hardware counters provide various types of performance statistics. The profiling component 305 is configured to read the appropriate hardware counters based on the particular performance statistics that have to be obtained.

In some embodiments, the profiling component 305 can be configured to operate as an event-based profiling module. That is, the profiling component 305 can sample the profile data based on various events, e.g., processor clock cycles (or processor cycles), processor instructions, etc. In some embodiments, the profiling component 305 is configured to sample the performance statistics every pre-defined number of instructions executed by the execution unit 105. An example of the profiling component 305 is "Perf," but other profiling tools can be used.

The density computing module 310 computes a density of various programming language constructs based on the data generated in the profile data. For example, the density computing module 310 computes a density of the functions in the binary code based on their corresponding frequencies of execution and sizes. After the density is computed, the density computing module 310 updates the profile data to include the density of the functions. Though the density computing module 310 and the profiling component 305 are shown as separate modules, they may be integrated. In some embodiments, the resulting integrated module may be similar to the profiling tool 125 of FIG. 1.

The linking module 135 optimizes the binary code, e.g., binary code 110, by profiling the binary code based on the computed density of the programming language constructs. Continuing with the example of computing a density of the functions of the binary code, the linking module 135 optimizes the binary code by placing denser functions closer to the front of the binary code 110 starting with the most-dense function at the front of the binary code 110. That is, the functions are placed in decreasing order of their corresponding density. The linking module generates an optimized binary code, e.g., modified binary code 115, based on such density profiling. The modified binary code 115 is loaded to the memory 130 for further execution by the execution unit 105.

Figure 4:
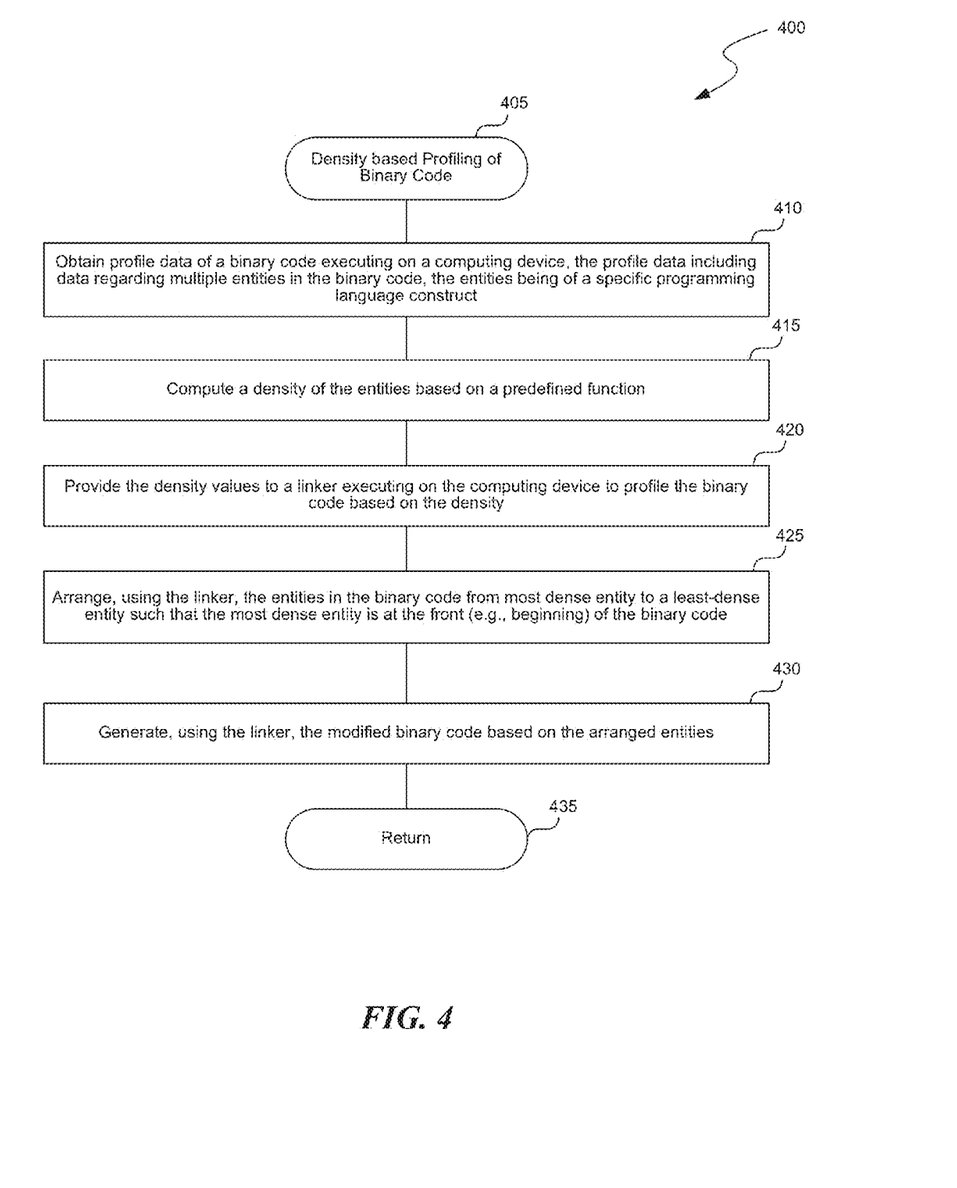
FIG. 4 is a flow diagram of a process for profiling a binary code based on density of programming language constructs in the binary code, consistent with various embodiments.

FIG. 4 is a flow diagram of a process 400 for profiling a binary code based on density of programming language constructs in the binary code, consistent with various embodiments of the disclosed technology. The process 400 may be executed in a system such as system 300 of FIG. 3 and can be used in an environment such as system 100 of FIG. 1. The process 400 begins at block 405, and at block 410, the profiling component 305 obtains profile data of a binary code executing at the system 300. The profile data can include various performance statistics regarding multiple entities in the binary code. The entities can be of a specific programming language construct, for example, a function, a data structure etc.

At block 415, the density computing module 310 computes a density of the entities, e.g., based on a specified function. For example, the specified function can consider the frequencies of execution/access and sizes of the entities for computing the density of the entities. Execution frequency can include the number of times a function is executed (e.g., over a period) and/or the percentage of application time spent in the function.

At block 420, the density computing module 310 provides the density values of the entities to the linking module 135 for profiling the binary code based on the density of the entities. The density computing module 310 may provide the density value at specified intervals, e.g., every day, or based on events, e.g., when a performance metric of the system 300 falls below a specified threshold. In some embodiments, instead of the density computing module 310 sending the density values, the linking module 135 may be configured to fetch the density values from the density computing module 310.

At block 425, the linking module 135 profiles the binary code by rearranging the entities in the binary code based on their corresponding density values. The linking module 135 arranges the entities in the binary code from most dense entity to a least-dense entity such that the most dense entity is at the front (e.g., beginning) of the binary code.

At block 430, the linking module 135 generates the modified binary code based on the rearranged entities, and the process returns at block 435.

Those skilled in the art will appreciate that the logic illustrated in FIG. 4 and described above, and in each of the flow diagrams discussed below, may be altered in various ways. For example, the order of the logic may be rearranged, substeps may be performed in parallel, illustrated logic may be omitted where unnecessary, other logic may be included in order to render the process more efficient, etc.

Figure 5:
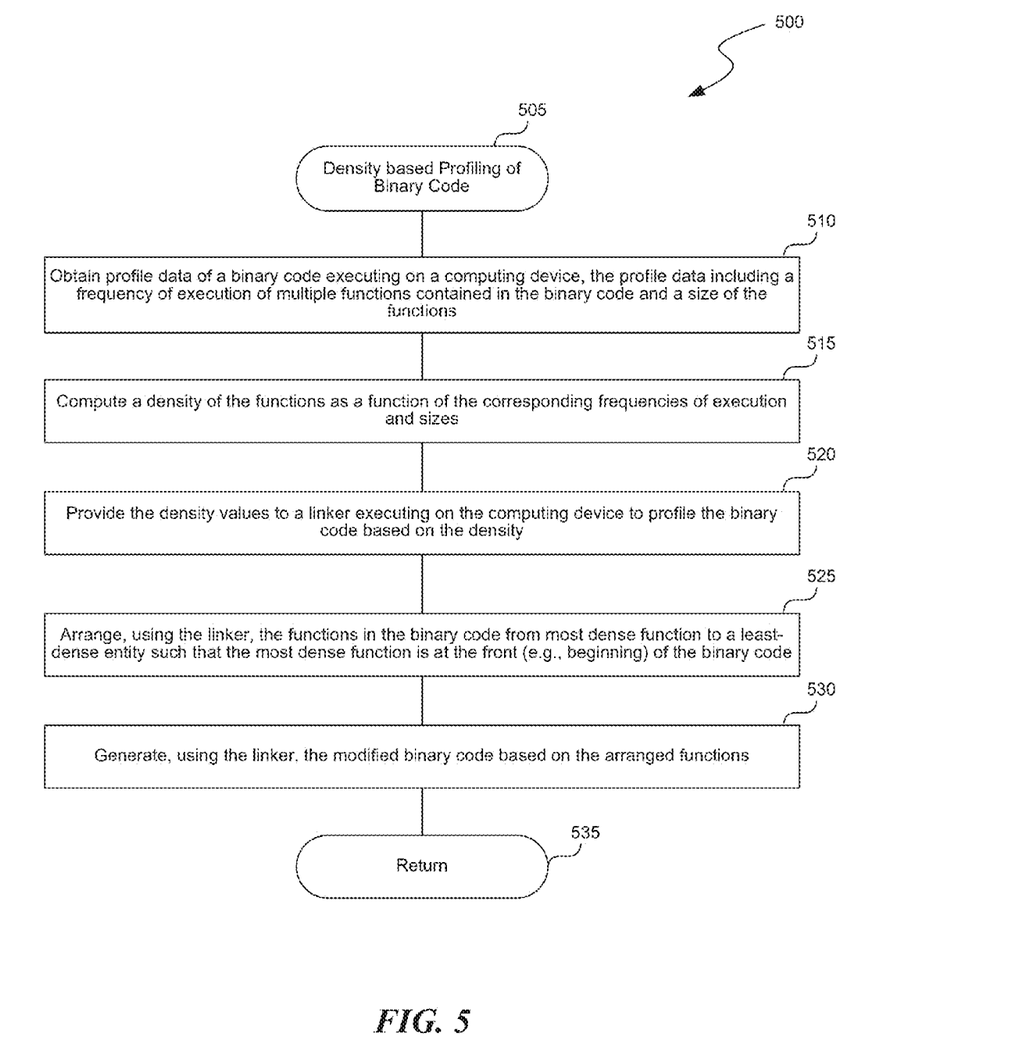
FIG. 5 is a flow diagram of a process for profiling a binary code based on a density of a programming language construct, e.g., functions, in the binary code, consistent with various embodiments.

FIG. 5 is a flow diagram of a process 500 for profiling a binary code based on a density of the functions in the binary code, consistent with various embodiments of the disclosed technology. The process 500 may be executed in a system such as system 300 of FIG. 3 and can be used in an environment such as system 100 of FIG. 1. The process 500 begins at block 505, and at block 510, the profiling module obtains profile data of a binary code executing at the system 300. The profile data can include various performance statistics regarding multiple functions in the binary code. For example, the profile data can include a frequency of execution of the functions contained in the binary code and a size of the corresponding functions.

At block 515, the density computing module 310 computes a density of the functions based on a specified function. For example, the specified function can compute the density of the functions by dividing their corresponding frequencies of execution with their sizes. Execution frequency can include the number of times a function is executed (e.g., over a period) and/or the percentage of application time spent in the function.

At block 520, the density computing module 310 provides the density values of the functions to the linking module 135 for profiling the binary code based on the density of the functions. In some embodiments, the linking module 135 may fetch the density values from the density computing module 310. The density computing module 310 may send, or the linking module 135 may receive the density value at specified intervals, e.g., every day, or based on various events, e.g., when a performance metric of the system 300 falls below a specified threshold.

At block 525, the linking module 135 profiles the binary code by rearranging the functions in the binary code based on their corresponding density values. The linking module 135 arranges the functions in the binary code from most dense function to a least-dense function such that the most dense function is at the front (e.g., beginning) of the binary code.

At block 530, the linking module 135 generates the modified binary code based on the rearranged functions, and the process returns at block 535.

Figure 6:
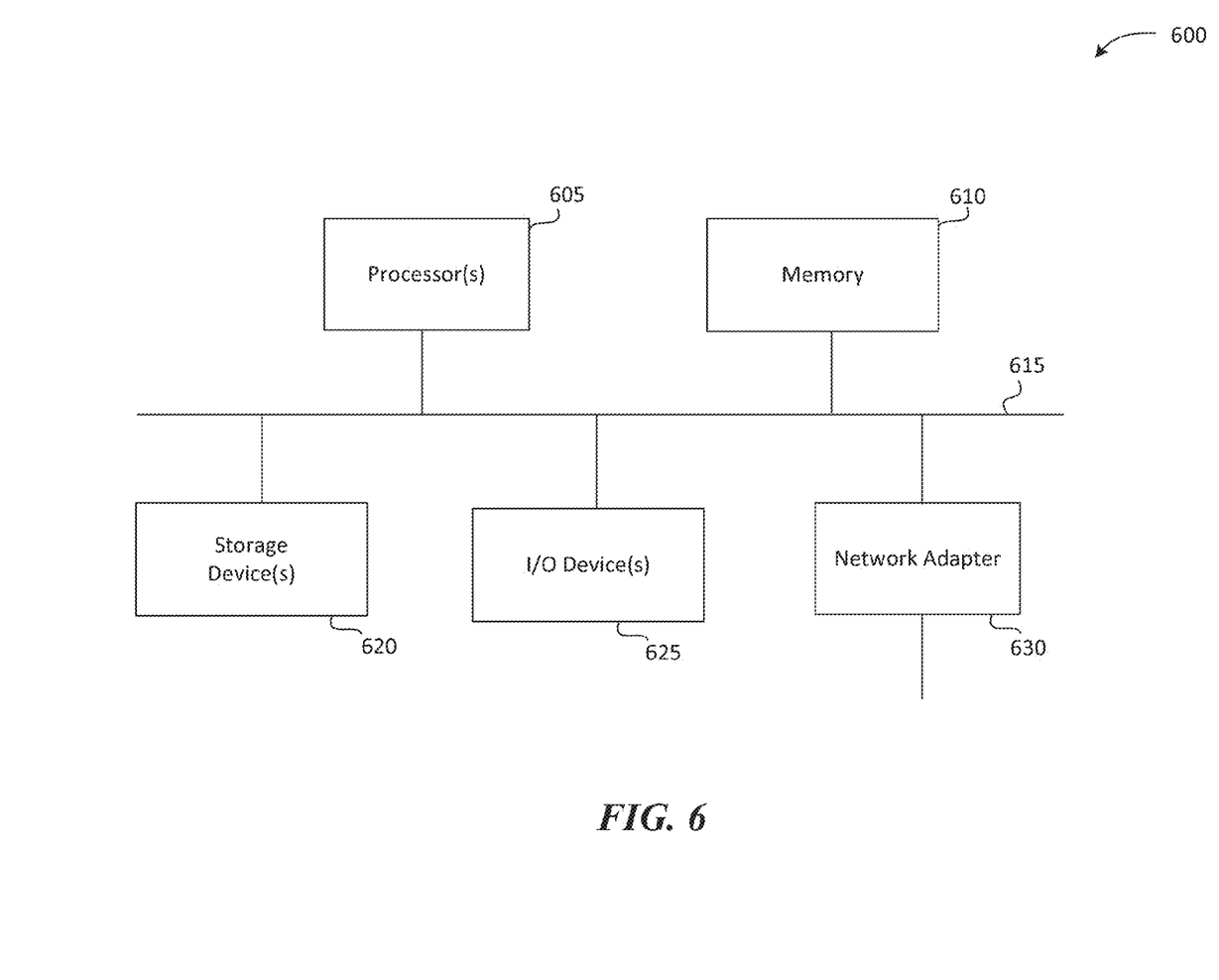
FIG. 6 is a block diagram of a computer system as may be used to implement features of some embodiments.

FIG. 6 is a block diagram of a computer system as may be used to implement features of some embodiments of the disclosed technology. The computing system 600 may be used to implement any of the entities, components or services depicted in the examples of FIGS. 1-5 (and any other components described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method performed by a computing device, comprising:
    obtaining profile data from execution of a binary code of an application on the computing device, the profile data including multiple density values indicating a density of multiple functions in the binary code, wherein the density of a first function of the functions is computed based on a frequency of execution of the first function and the size of the first function, wherein the frequency of execution is determined based on at least a percentage of runtime of the application consumed by the first function;
    providing the density values to a linker;
    modifying, by the linker, the binary code based on the density of the functions to generate a modified binary code, the modifying rearranging functions in decreasing order of density; and
    loading, by the linker, the modified binary code to a memory of the computing device for execution, wherein loading the modified binary code includes clustering functions with density above a specified threshold at a lower address range of the memory.

2. The method of claim 1, wherein obtaining the profile data including the density of the functions includes:
    obtaining a frequency of execution of the functions,
    determining a size of the functions, and
    computing the density of the functions as a function of their corresponding frequencies of execution and sizes.

3. The method of claim 2, wherein the density of functions is computed by dividing their corresponding frequencies of execution with their corresponding sizes.

4. The method of claim 1, wherein obtaining the profile data includes obtaining at least one of (a) a frequency of execution of the functions or (b) a size of the functions using one or more hardware counters of the computing device on which the binary code is executing.

5. The method of claim 4, wherein obtaining the profile data includes sampling the execution of the binary code using a profiling application to obtain the profile data from the one or more hardware counters.

6. The method of claim 5, wherein the sampling is performed based on an event during the execution of the binary code.

7. The method of claim 6, wherein the event includes a processor instruction.

8. The method of claim 6, wherein the event includes a clock cycle of a processor of the computing device.

9. The method of claim 6, wherein the sampling is performed for a specified number of events.

10. The method of claim 1, wherein the binary code is generated by compiling a corresponding source code.

11. The method of claim 1, wherein the binary code is free from instrumentation.

12. A computer-readable storage memory storing instructions, comprising:
    instructions for obtaining profile data from execution of a binary code of an application on a computing device, the profile data including a density of multiple entities in the binary code, the entities being of a specific programming language construct, wherein the density of a first entity of the entities is computed based on a frequency of execution of the first entity and the size of the first entity, wherein the frequency of execution is determined based on at least a percentage of runtime of the application consumed by the first entity;
    instructions for providing the density to a linker executing on the computing device;
    instructions for arranging the entities in the binary code based on the density of the entities to generate a modified binary code, the arranging including arranging the entities from a most-dense entity to a least-dense entity with the most-dense entity placed at the beginning of the binary code; and
    instructions for loading, by the linker, the modified binary code to a memory of the computing device for execution, wherein loading the modified binary code includes clustering entities with density above a specified threshold at a lower address range of the memory.

13. The computer-readable storage memory of claim 12, wherein the specific programming language construct is a function.

14. The computer-readable storage memory of claim 13, wherein the instructions for obtaining the profile data include:
    obtaining a frequency of execution of functions corresponding to the entities,
    determining a size of the functions, and
    computing the density of the functions as a quotient of their corresponding frequencies of execution and sizes.

15. The computer-readable storage memory of claim 12, wherein the programming construct is a data structure.

16. The computer-readable storage memory of claim 15, wherein the instructions for obtaining the profile data include:
    instructions for obtaining a frequency of an access of data fields corresponding to the entities,
    instructions for determining a size of the data fields, and instructions for computing the density of the data fields as a quotient of their corresponding frequencies of access and sizes.

17. The computer-readable storage memory of claim 12, wherein the instructions for obtaining the profile data include instructions for sampling the execution of the binary code using a profiling application to obtain the profile data from one or more hardware counters of a computing device on which the binary code is executing.

18. A system, comprising:
- a processor;
- a profiling component configured, in cooperation with the processor, to generate a profile data of a binary code of an application, the profile data including a frequency of execution of multiple functions contained in the binary code and a size of the functions;
- a density computing module configured to compute a density of the functions based on their corresponding frequencies of execution and sizes, wherein the frequency of execution of a first function of the functions is determined based on at least a percentage of runtime of the application consumed by the first function; and
- a linking module configured to arrange the functions in the binary code based on their corresponding density to generate a modified binary code, the linking module configured to arrange the functions from a most-dense function to a least-dense function with the most-dense function at the beginning of the binary code, wherein the linking module is configured to load the modified binary code to a memory of the system for execution, wherein loading the modified binary code includes clustering functions with density above a specified threshold at a lower address range of the memory.

19. The system of claim 18, wherein the profiling module obtains the profile data using one or more hardware counters of the processor.

* * * * *